(12) United States Patent
Chen et al.

(10) Patent No.: US 7,704,069 B2
(45) Date of Patent: Apr. 27, 2010

(54) INJECTION MOLDING APPARATUS HAVING SWIVELING NOZZLES

(75) Inventors: Jincheng Chen, Leawood, KS (US); Brian R. Lefebure, Lee's Summit, MO (US); Paul W. Mitchell, Blue Springs, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 884 days.

(21) Appl. No.: 11/313,168

(22) Filed: Dec. 20, 2005

(65) Prior Publication Data

US 2007/0141195 A1 Jun. 21, 2007

(51) Int. Cl.
*B29C 45/20* (2006.01)
(52) U.S. Cl. ........................ 425/568; 425/567; 425/569
(58) Field of Classification Search ................. 425/568, 425/569, 190, 571, 574, 567, 549, 564, 565, 425/566, 572
See application file for complete search history.

(56) References Cited

U.S. PATENT DOCUMENTS

| | | | | |
|---|---|---|---|---|
| 2,814,831 | A | * 12/1957 | Mckee, Jr. | ................... 425/568 |
| 3,512,216 | A | 5/1970 | Voelker | |
| 3,535,742 | A | * 10/1970 | Marcus | ....................... 425/146 |
| 3,559,245 | A | * 2/1971 | Ryan | ........................... 425/549 |
| 3,718,166 | A | * 2/1973 | Gordon | ....................... 141/236 |
| 3,758,252 | A | 9/1973 | Kohler | |
| 3,940,226 | A | 2/1976 | Verhoeven | |
| 4,076,475 | A | * 2/1978 | Trueblood | ................... 425/159 |
| 4,299,791 | A | * 11/1981 | Aoki | ........................ 264/328.9 |
| 4,416,608 | A | 11/1983 | Deardurff | |
| 4,751,037 | A | * 6/1988 | Faneuf | ................... 264/328.11 |
| 4,793,795 | A | 12/1988 | Schmidt et al. | |
| 4,810,184 | A | 3/1989 | Gellert et al. | |

(Continued)

FOREIGN PATENT DOCUMENTS

JP 3875851 B 1/2007

(Continued)

OTHER PUBLICATIONS

PCT/US2006/047873 International Search Report and Written Opinion of the International Searching Authority dated Jan. 15, 2009 (13 pgs).

(Continued)

*Primary Examiner*—Yogendra N Gupta
*Assistant Examiner*—Emmanuel S Luk
(74) *Attorney, Agent, or Firm*—Hovey Williams LLP

(57) ABSTRACT

Injection molding apparatus has upper and lower mold halves that split along the center line of the parison cavity and the gate opening leading thereto. Each hot melt injection nozzle is received within a tubular insert cup having a reduced diameter tip that is seated within the gate opening. The cup is mounted to the lower mold half so as to remain secured thereto as the upper mold half opens and closes the mold. The base end of each nozzle has a swivel ball and socket relationship with the manifold block which supplies it with hot melt, while the tip end of each injection nozzle has a swivel ball and socket type interface with the interior front end of the insert cup, thus providing for dimensional variations in the parts of the tooling that arise during non-uniform thermal expansion and contraction thereof.

20 Claims, 10 Drawing Sheets

U.S. PATENT DOCUMENTS

| | | | |
|---|---|---|---|
| 5,299,928 A | 4/1994 | Gellert et al. | |
| 5,310,332 A | 5/1994 | Ito et al. | |
| 5,522,720 A | 6/1996 | Schad | |
| 5,578,329 A | 11/1996 | Hehl | |
| 5,716,540 A | 2/1998 | Matiacio et al. | |
| 5,879,727 A | 3/1999 | Puri | |
| 6,245,278 B1 | 6/2001 | Lausenhammer et al. | |
| 6,261,084 B1 | 7/2001 | Schmidt | |
| 6,302,680 B1 | 10/2001 | Gellert et al. | |
| 6,341,954 B1 | 1/2002 | Godwin et al. | |
| 6,722,011 B1 | 4/2004 | Bacon | |
| 6,726,467 B1 | 4/2004 | Lefebure | |
| 6,780,518 B2 * | 8/2004 | Azechi et al. | 428/451 |
| 6,923,638 B2 * | 8/2005 | Chen | 425/564 |
| 7,021,924 B2 * | 4/2006 | Oyama | 425/571 |
| 7,163,390 B2 | 1/2007 | Zoppas et al. | |
| 2001/0016566 A1 * | 8/2001 | Allan et al. | 510/447 |
| 2007/0141195 A1 | 6/2007 | Chen et al. | |

FOREIGN PATENT DOCUMENTS

| | | |
|---|---|---|
| WO | WO 01/41997 | 6/2001 |

OTHER PUBLICATIONS

PCT/US2006/047873 Preliminary Report on Patentability and Written Opinion of the International Searching Authority dated Aug. 27, 2009 (9 pgs).

PCT/US2009/030317 International Search Report and Written Opinion of the International Searching Authority dated Aug. 19, 2009 (10 pgs).

* cited by examiner

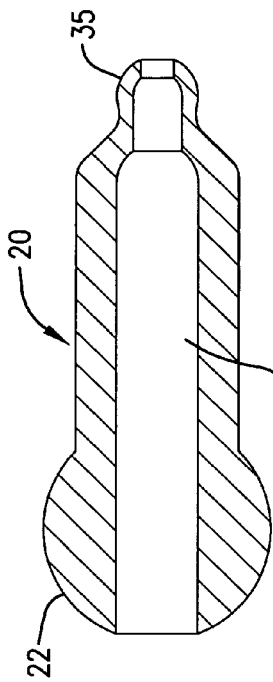
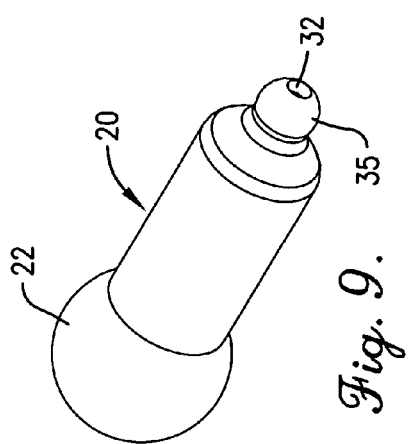
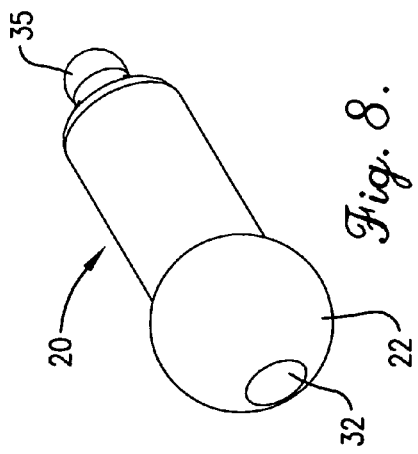
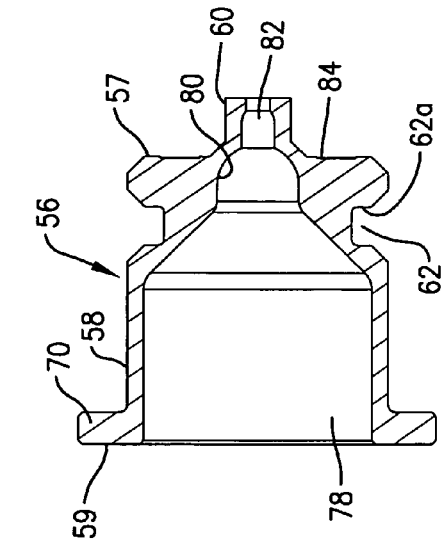
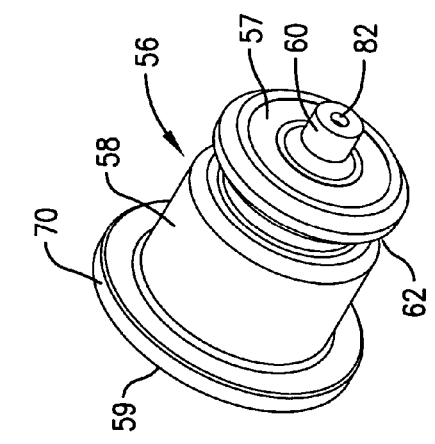
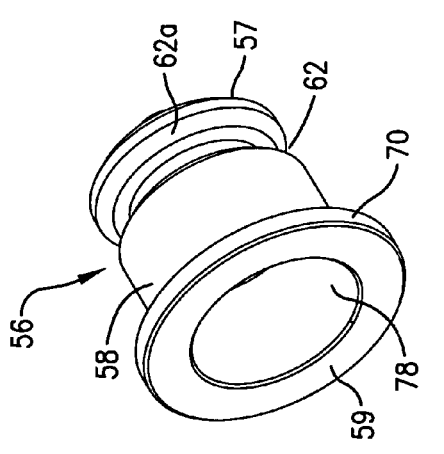

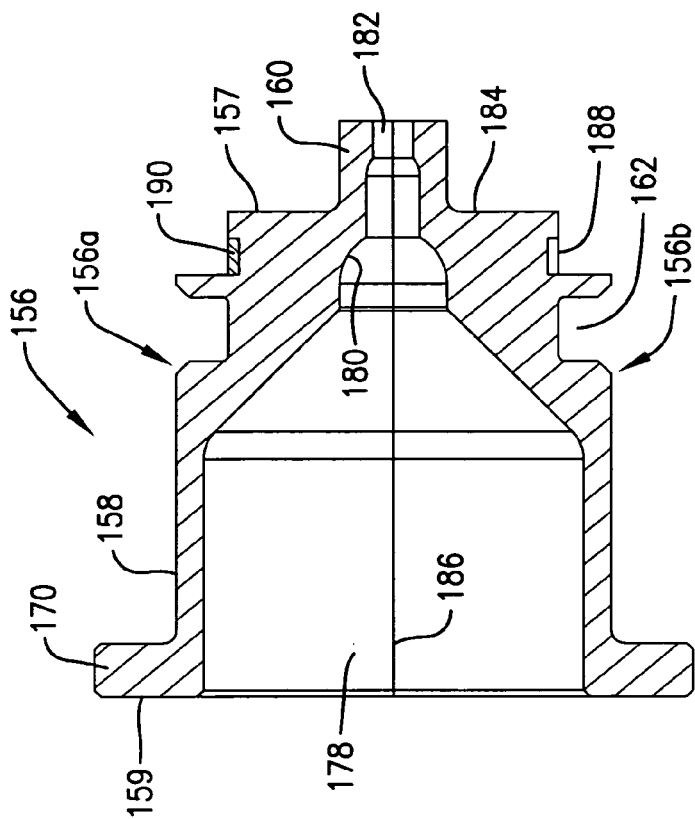
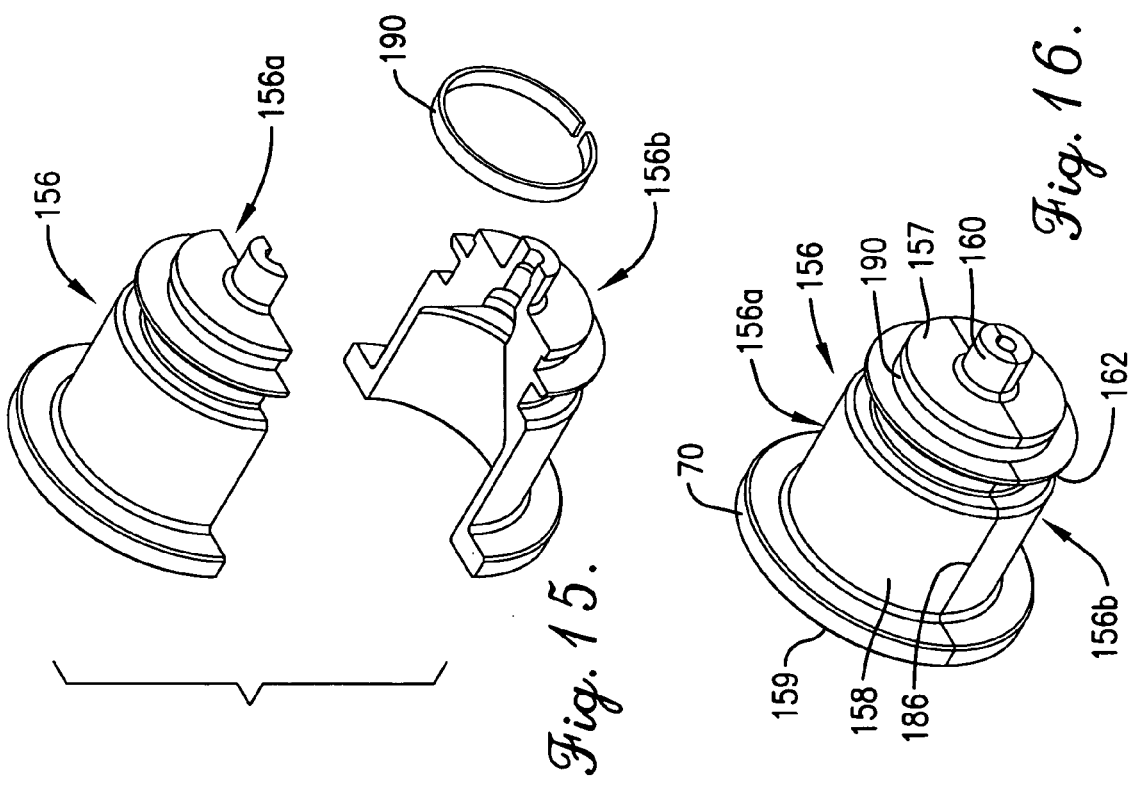

INJECTION MOLDING APPARATUS HAVING SWIVELING NOZZLES

TECHNICAL FIELD

This invention relates to injection blow molding machines and, more particularly, to improvements in tooling for the injection molding station of such a machine.

BACKGROUND

The parison molding cavity at the injection molding station of a typical injection blow molding machine is formed in part by a pair of superimposed mold halves that split or separate along the center line of each gate opening and parison cavity. Hot melt injection nozzles have discharge tips that are seated in the gate openings. To remove a set of newly formed parisons from the mold, the upper mold halves are raised off the bottom mold halves, and the cores that carry the new parisons are then lifted and rotated out of the mold. A new set of cores is placed in the cavities of the bottom mold halves and the mold is closed, creating a diametrical sealing relationship between each nozzle tip and the wall of its gate opening and preparing the mold cavities to receive hot melt through the nozzles.

For a variety of reasons, it is difficult to maintain both the upper and lower mold halves at uniform temperatures at all times. Consequently, the upper and lower mold halves experience different degrees of expansion and contraction, and perfect alignment between upper and lower mold halves is rarely achieved. This condition is aggravated by the fact that the hot injection nozzles typically run at significantly higher temperatures than either of the mold halves.

These thermal expansion and misalignment issues inherent in split parison cavity design typically produce wear and plastic leakage at the interface between the nozzle tip and the parison cavity. The typical fix involves replacing the nozzles and repairing the gate opening region where the interface occurs.

Another problem with conventional tooling involves the start up procedure following prolonged shut down of the machine. Initially, the nozzles and the hot manifold block to which they are attached are disposed in a retracted position with the nozzles pulled back out of the mold. To begin the start up procedure, mounting bolts on a retainer block that attach each nozzle to the manifold block are intentionally loosened so that there is some slight freedom of movement of the nozzles relative to the manifold block. The manifold block and nozzles are then heated up to their operating temperature, while the mold cavities are maintained at their operating temperatures. Then, the manifold block and nozzles are pushed forward to properly seat the nozzle tips in their respective gate openings leading to the cavities. As the top mold halves are subsequently lowered against the bottom halves, the loose nozzles are engaged and realigned as need be by the lowering mold halves. Once the mold is fully closed, all of the bolts on every nozzle are retightened to secure the nozzles in their adjusted positions. Depending upon the number of mold cavities involved, this can be a laborious and time-consuming process. At shut down, the manifold and nozzles must be pulled away from the parison cavities to prevent the nozzles from binding up in the mold and/or becoming damaged as the mold halves and nozzles cool down at different rates.

There is also a problem with leakage at the base end of each nozzle and the manifold block. The repeated impact from the upper mold half during closing of the mold and effects of significant temperature differentials, as well as loosening and retightening operations of the mounting blocks for the nozzles, necessarily result in leakage problems for the rear areas of the nozzle as well as the discharge tips.

BRIEF DESCRIPTION OF THE DRAWINGS

FIG. 8 is a rear isometric view of an injection nozzle constructed in accordance with the principles of the present invention;

FIG. 9 is a front isometric view thereof;

FIG. 10 is a longitudinal cross-sectional view thereof;

FIG. 11 is a rear isometric view of an insert cup constructed in accordance with the principles of the present invention;

FIG. 12 is a front isometric view thereof;

FIG. 13 is a longitudinal cross-sectional view thereof;

FIG. 15 is a front exploded view of an alternative embodiment of insert cup having a two-part design;

FIG. 16 is a front isometric view thereof; and

FIG. 17 is a longitudinal cross-sectional view of the two-piece alternative embodiment of insert cup.

DETAILED DESCRIPTION

Figure 1:
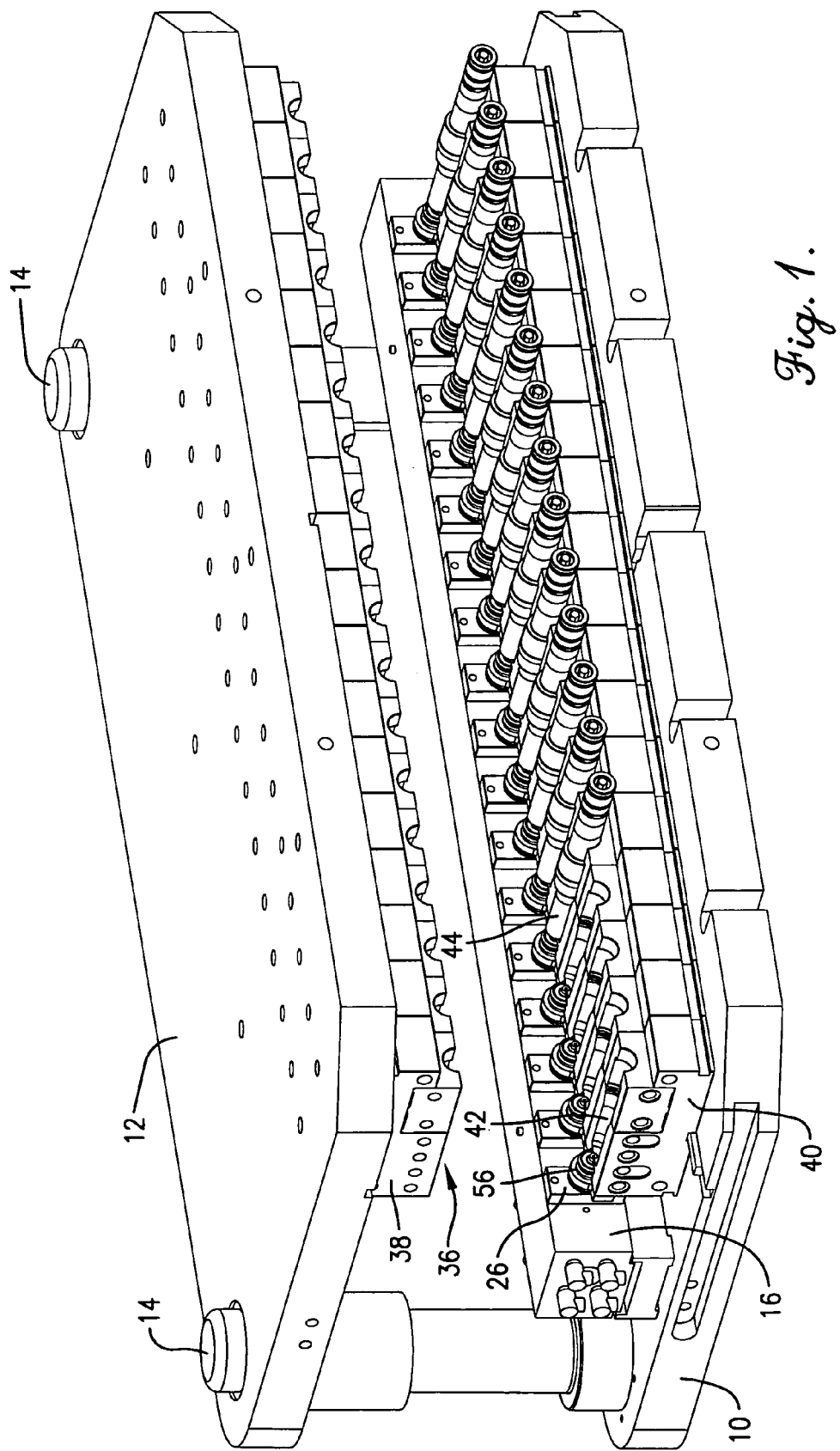
FIG. 1 is an isometric view of tooling that incorporates the principles of the present invention at the injection molding station of an injection blow molding machine, the cavity molds being illustrated in an open condition.
Figure 2:
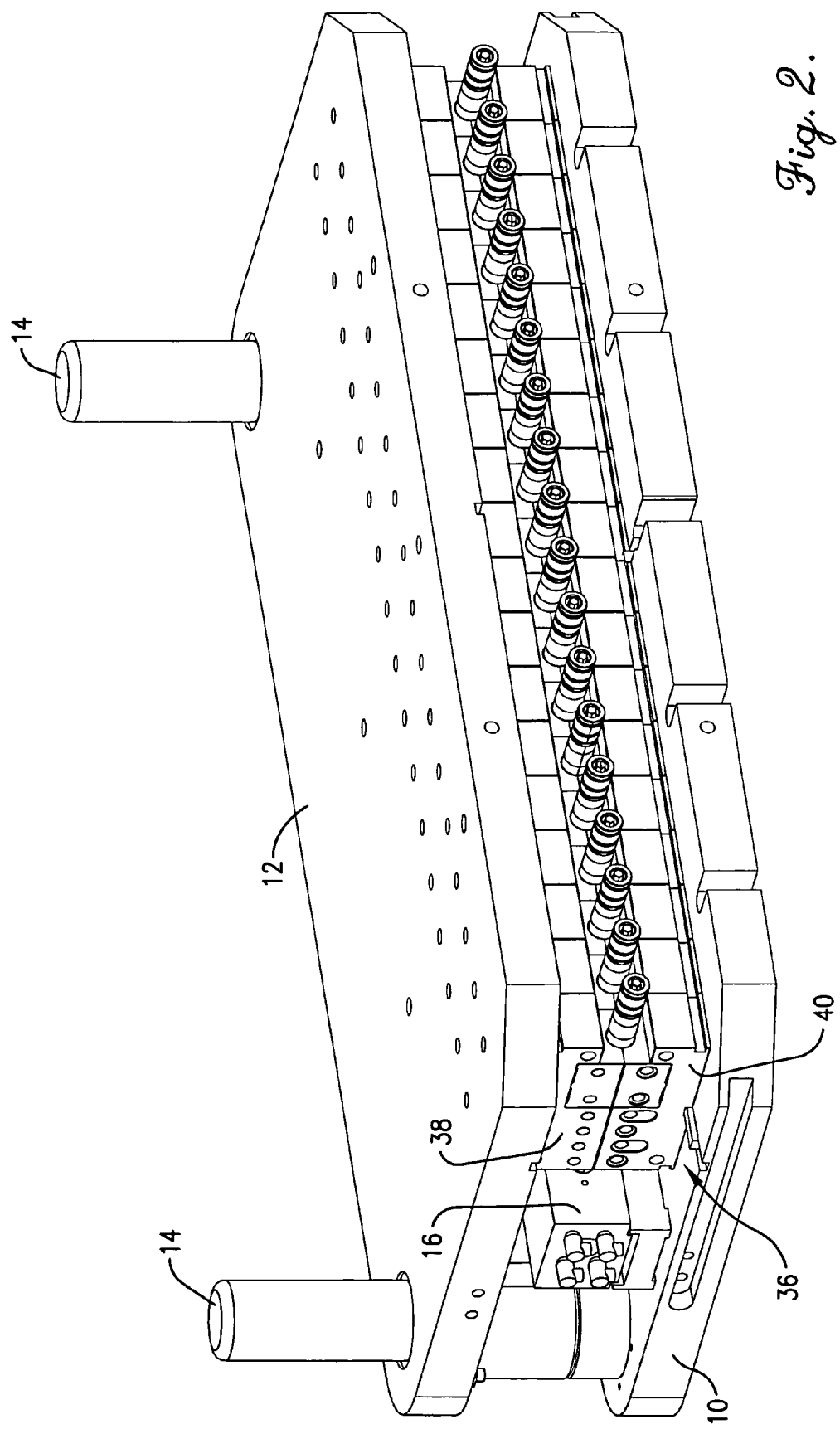
FIG. 2 is an isometric view similar to FIG. 1 with the cavity molds closed.
Figure 3:
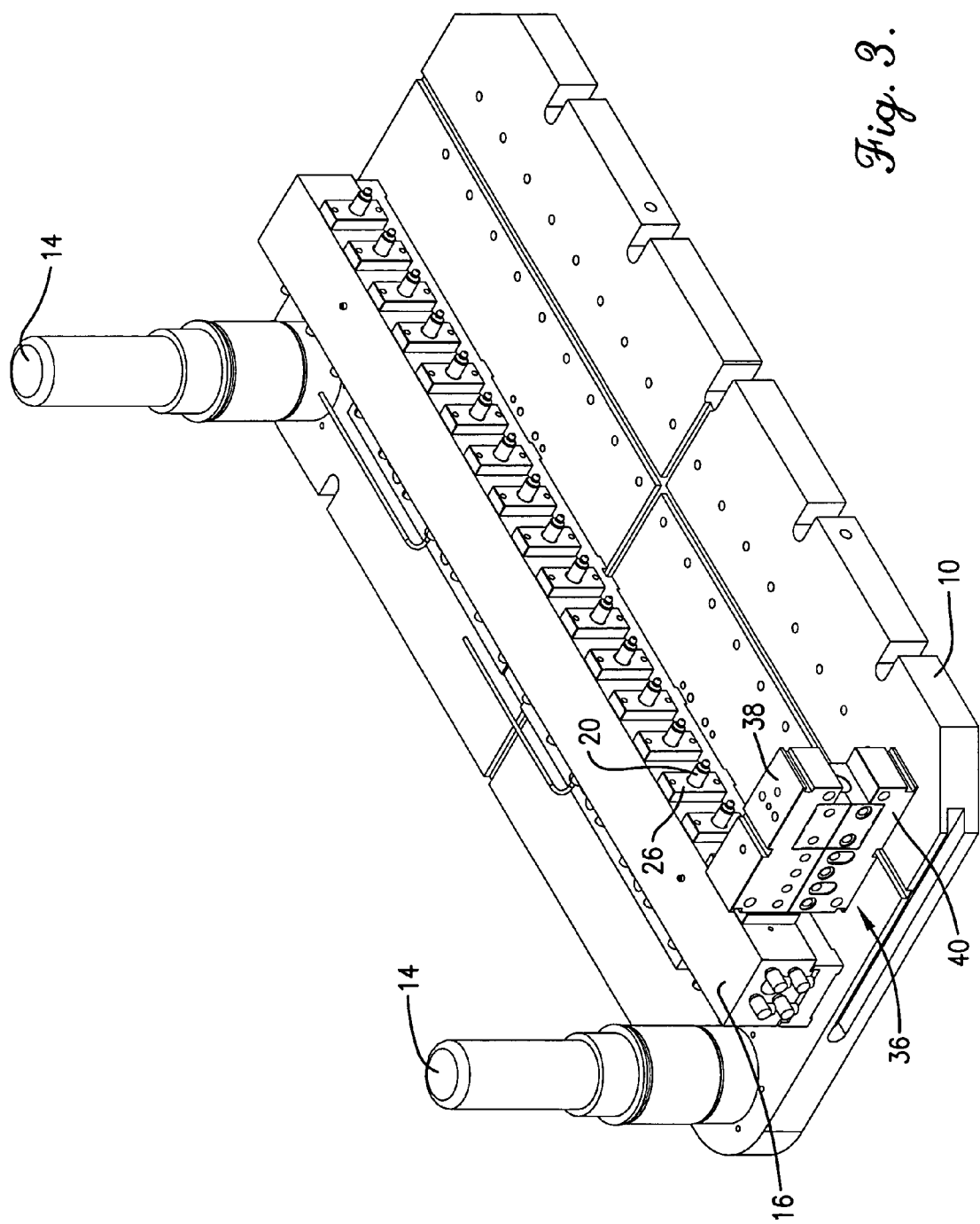
FIG. 3 is an isometric view similar to FIGS. 1 and 2 but with the top die set member and other components removed to reveal the manifold block and its injection nozzles.
Figure 4:
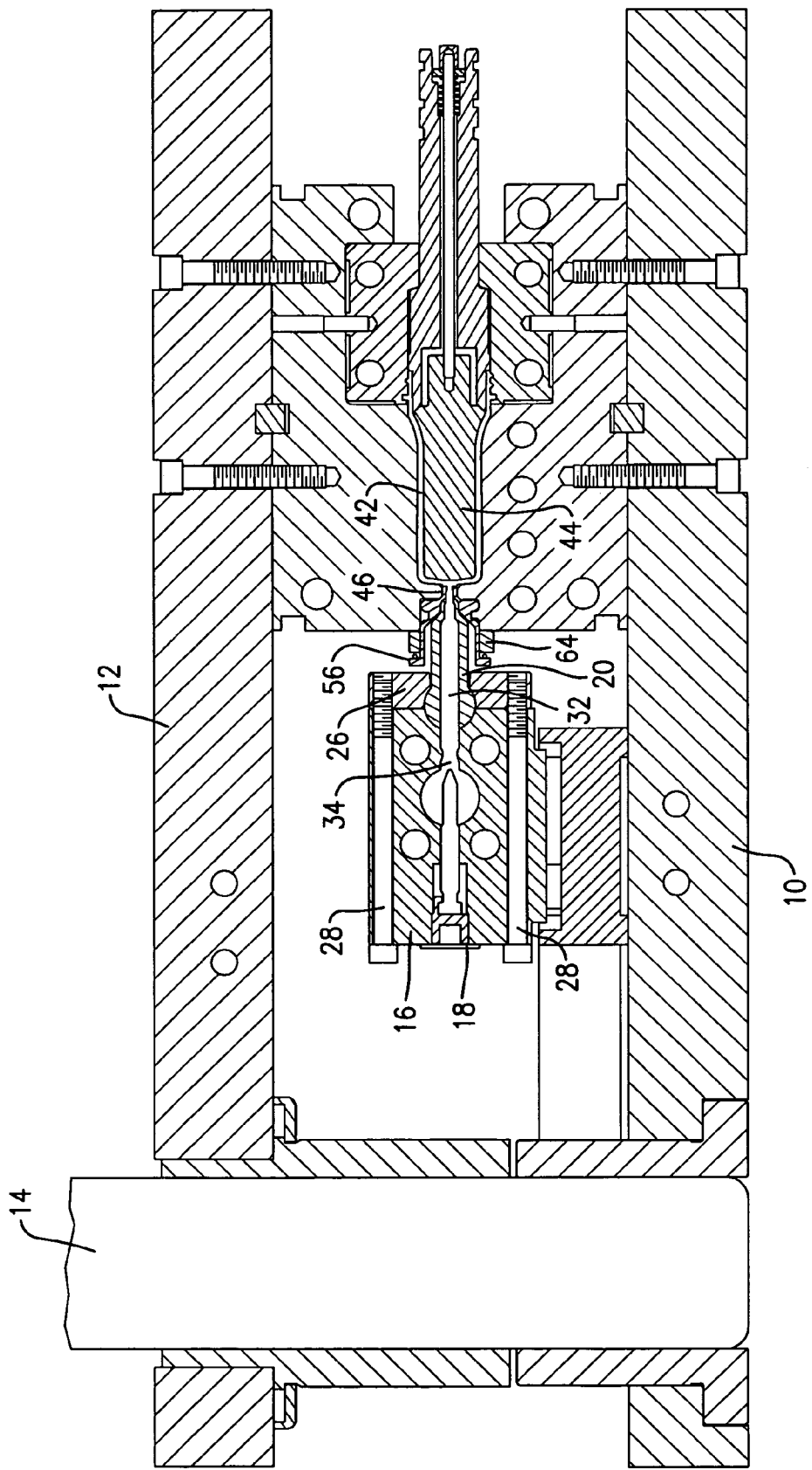
FIG. 4 is a vertical cross-sectional view through the tooling and machine components with the cavity molds closed.
Figure 5:
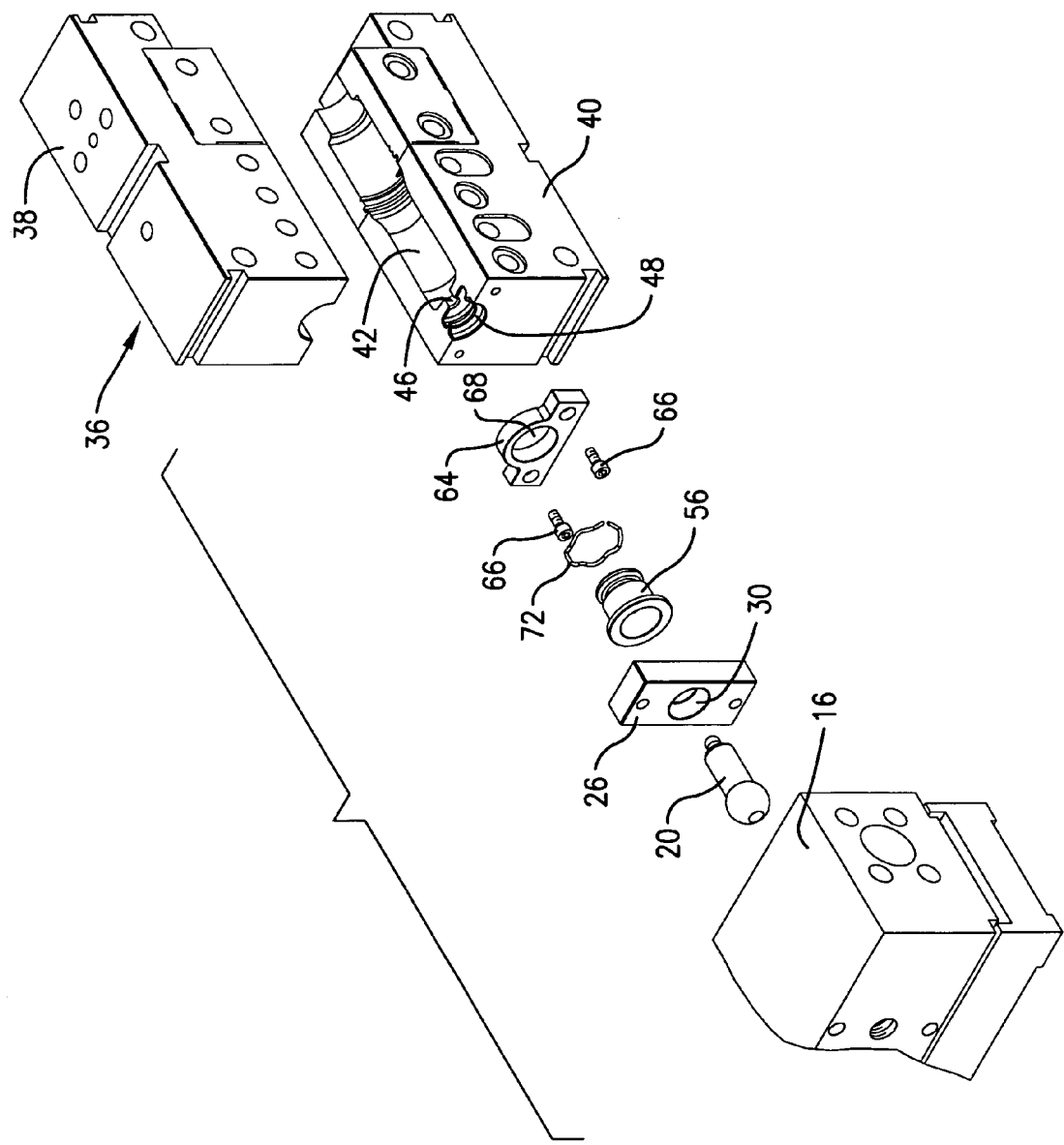
FIG. 5 is a fragmentary rear exploded view of the tooling.
Figure 6:
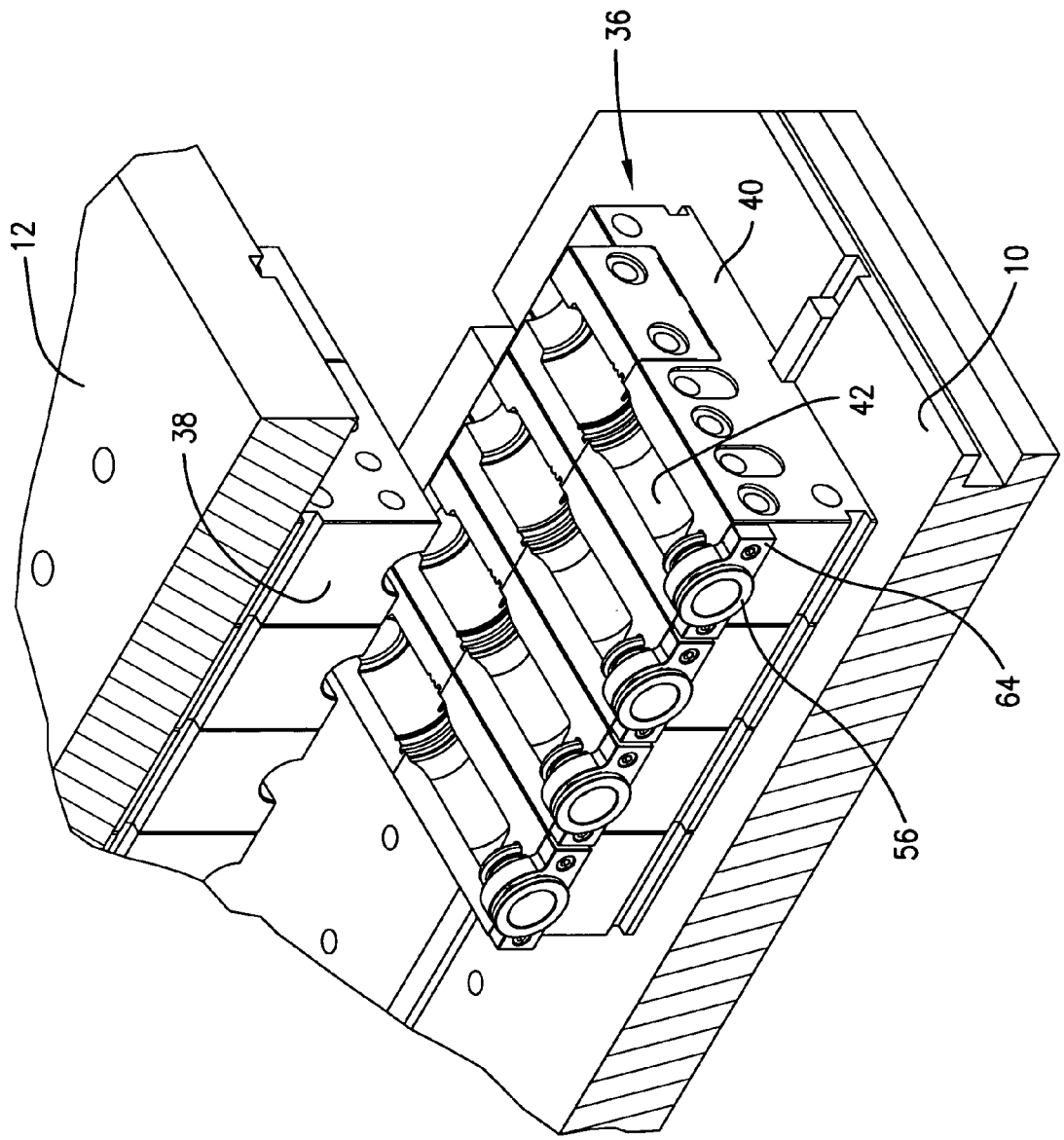
FIG. 6 is a fragmentary isometric view of the molds in an open condition illustrating how gate insert cups for receiving the injection nozzles remain with the bottom mold halves when the molds open.
Figure 7:
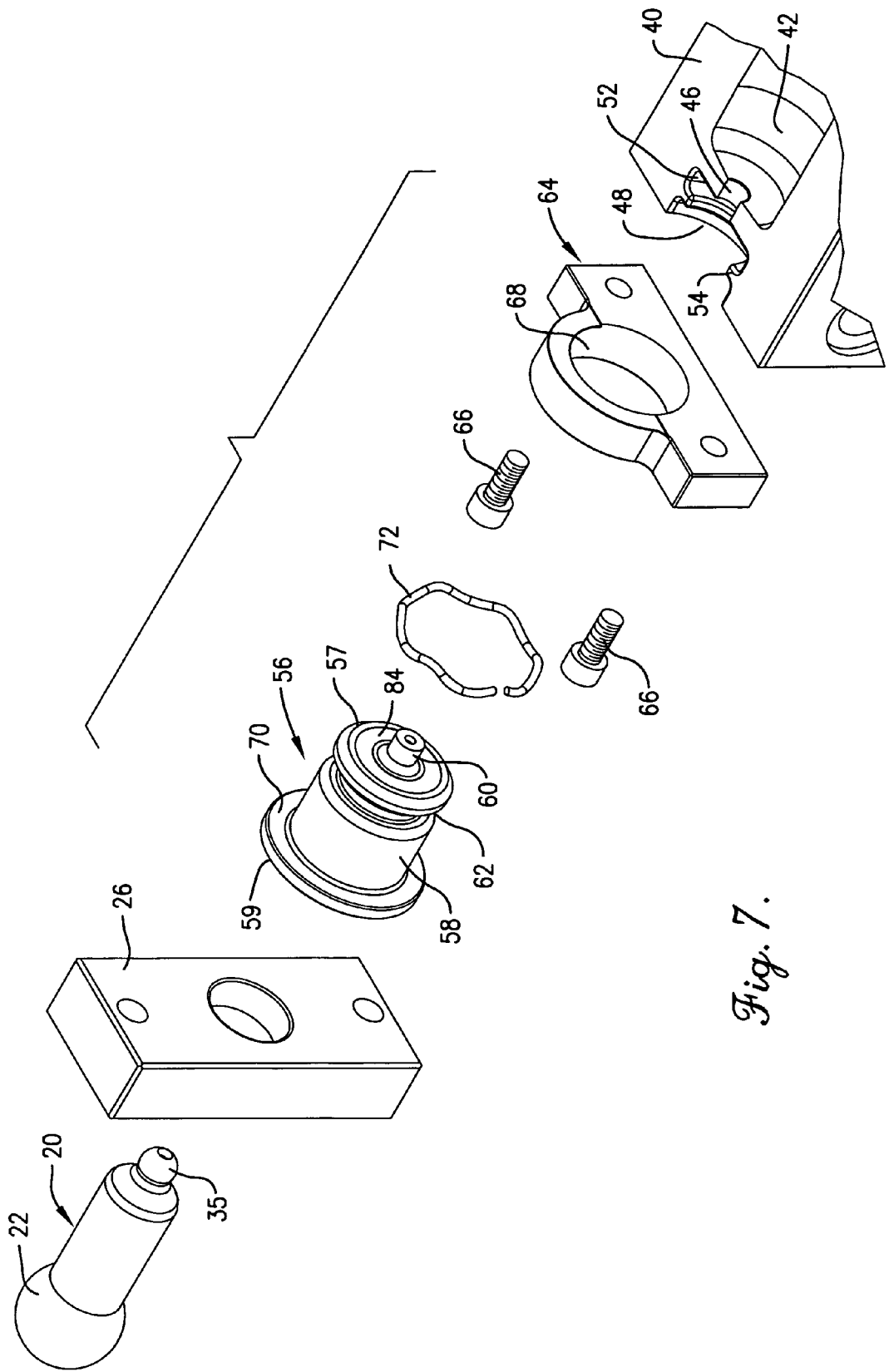
FIG. 7 is a fragmentary front exploded view of the tooling.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

FIGS. 1-4 illustrate conventional machine parts at the injection molding station of a typical injection blow molding machine, as well as tooling in accordance with the present invention. In this type of machine, the mold halves are designed to split and separate along the center line of the parison mold cavity and the gate opening leading thereto, as described more fully below.

The machine parts include a lower plate-like die set member 10 secured to the bed of the machine (not shown), and an upper plate-like die set member 12 that overlies member 10 and is moveable by means not illustrated vertically toward and away from member 10 on upright guides 14. The tooling includes an elongated manifold block 16 that is secured to lower member 10 and has an inlet sprue 18 (FIG. 4) that is disposed to receive hot molten plastic material from a source of supply (not shown). Such hot melt is directed through internal passages in manifold block 16 to a series of injection nozzles 20 that project forwardly from the front side of manifold block 16. Preferably, nozzles 20 have at their base ends a ball and socket coupling relationship with the manifold block 16 in accordance with the principles set forth in U.S. Pat. No. 6,726,467 assigned to the assignee of the present invention and hereby incorporated by reference into the present specification.

Briefly described, and with reference also to FIGS. 5-14, each nozzle 20 has a generally spherical base 22 that is received by a concave swivel seat 24 in manifold block 16. The nozzle 20 is retained in its seat by a retainer block 26 that is bolted against the front face of manifold block 16 by a pair of long bolts 28. The back side of retainer block 26 has a concave face 30 that overlies spherical base 22 of nozzle 20 so as to permit nozzle 20 to swivel to a certain extent as may become necessary during molding operations. An axially extending through passage 32 in nozzle 20 communicates with a supply passage 34 within manifold block 16 in all positions of swivelled movement of nozzle 20 to provide for the discharge of hot melt from nozzles 20 in all positions thereof. Nozzle 20 is also provided with a generally spherical, convex tip 35.

Manifold block 16 with its nozzles 20 is moveable horizontally toward and away from additional tooling in the form of a series of parison molds 36, each of which includes an upper mold half 38 bolted to the upper member 12 and a lower mold half 40 bolted to the lower member 10. When each mold 36 is closed, mold halves 38, 40 cooperatively form a parison cavity 42 that receives an elongated core 44 from the opposite side of the apparatus. When the manifold block 16 is in its forward operating position as illustrated throughout the figures, injection nozzles 20 are disposed for injecting hot melt into the cavities 42. When manifold 26 is backed away from its forward position, the nozzles 20 are withdrawn from between the upper and lower mold halves 38, 40.

Figure 14:
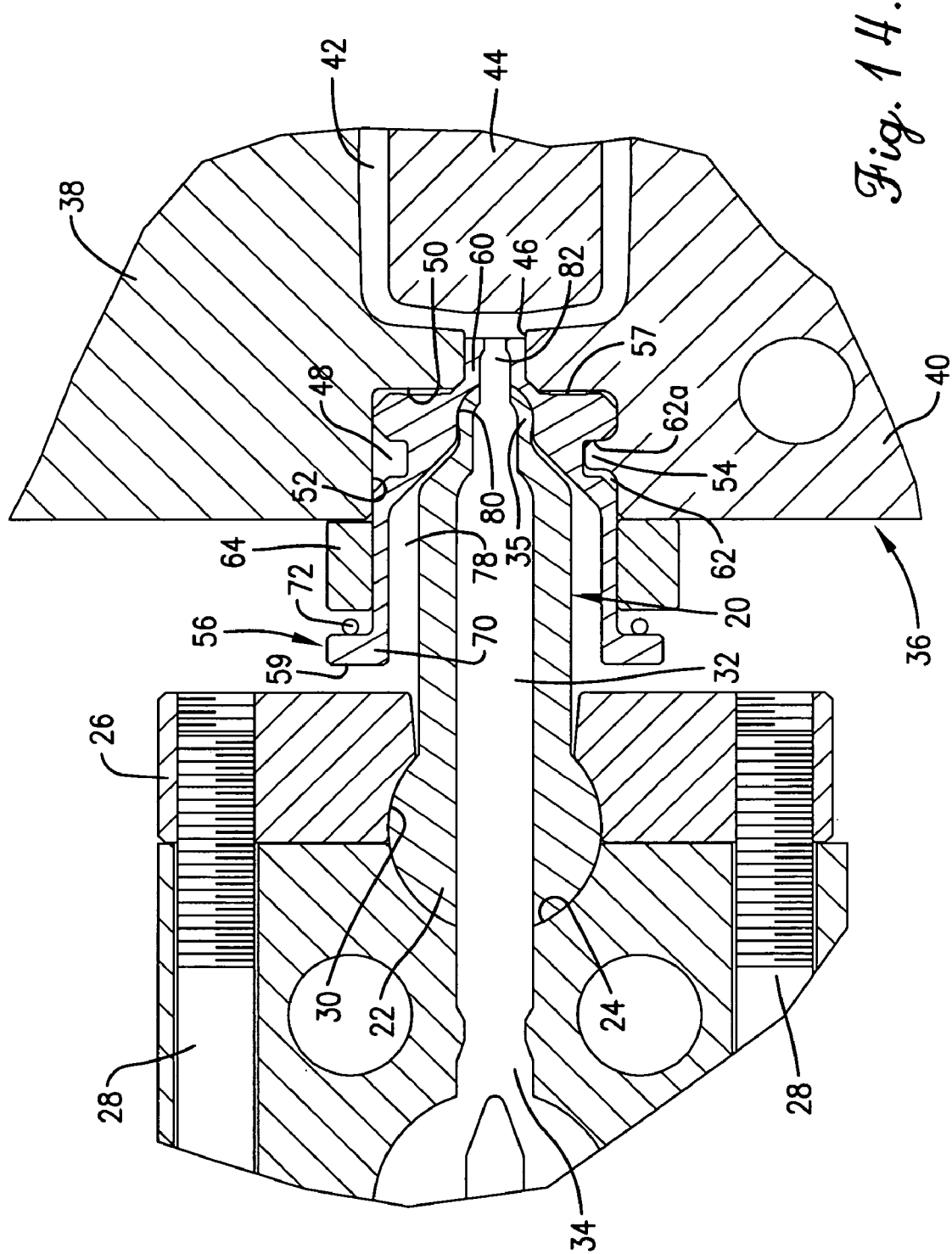
FIG. 14 is an enlarged, fragmentary vertical cross-sectional view through one cavity of the tooling with the mold closed and the injection nozzle seated within the insert cup.

As illustrated particularly in FIG. 14, each pair of mold halves 38, 40 also cooperatively defines a gate opening 46 at the manifold end of cavity 42 that is of significantly reduced dimensions relative to cavity 42. Gate opening 46 leads to cavity 42 from an enlarged void or well 48 formed in the manifold side of mold 36 when the latter is closed. Well 48 has a front end wall 50 formed by corresponding end wall surfaces in upper and lower mold halves 38, 40. Well 48 also includes an annular side wall 52 that is formed by corresponding sidewall surfaces of upper and lower mold halves 38, 40 when mold 36 is closed. The upper and lower sidewall surfaces are substantially identical to one another with the exception that the lower sidewall surface includes a radially inwardly projecting, semi-circular rib 54 that is not present on the upper mold half 38.

Each lower mold half 40 has attached thereto a nozzle-receiving insert cup 56 that occupies the well 48 when the mold 36 is closed. Each insert cup 56 is tubular and hollow, having a relative large diameter, generally cylindrical body portion 58 presenting front and rear ends 57 and 59, respectively. A smaller diameter tip portion 60 projects forwardly from front end 57. Tip portion 60 is cylindrical throughout its length so as to provide a diametrical sealing fit with the surrounding sidewalls of gate opening 46 when mold 38 is closed as illustrated in FIG. 14. Semi-circular rib 54 in lower mold half 40 fits up into an annular groove 62 in body portion 58. Groove 62 is axially wider than rib 54 to provide a limited amount of axial displacement of insert cup 56 relative to rib 54 for a purpose as hereinafter explained. Rib 54 thus acts as a stop to prevent outward axial dislodgement of insert cup 56 from mold 36.

Each insert cup 56 is mounted to the corresponding lower mold half 40 by its own retainer 64. Each retainer 64 is secured to lower mold half 40 by a pair of fastening bolts 66 and has a bore 68 aligned axially with well 48. Retainer 64 thus retains its insert cup 56 against dislodgement in a transverse direction from mold 36 when mold halves 38 and 40 separate, while rib 54 prevents outward axial displacement of insert cup 56 beyond a predetermined amount.

Rear end 59 of insert cup 56 is provided with a radially outwardly extending, annular flange 70 that is spaced slightly rearwardly from the rearmost face of retainer 64. Between flange 70 and retainer 64 is disposed a spring 72 that yieldably biases insert cup 56 in a rearward direction away from cavity 42. Thus, the front sidewall 62a of groove 62 is brought into abutting engagement with the front sidewall of rib 54 by spring 72. Preferably, spring 72 is of annular configuration and comprises a so-called "wave spring" available from a number of sources well known to those skilled in the art. One such spring is available from Smalley Steel Ring Company of Lake Zurich, Ill. as WAVO SPRING part no. RW-0125.

A large, cylindrical receiving chamber 78 is defined in the interior of body 58 and extends axially inwardly from open rear end 59 of body 58. Chamber 78 tapers inwardly adjacent the front end 57 of body 58 to present a rearwardly facing concave seat 80 of mating configuration with respect to convex nozzle tip 35. Whereas the cylindrical part of chamber 78 is significantly larger in diameter than the main body of nozzle 20, seat 80 has substantially the same dimensions as convex nozzle tip 35 so as to intimately engage tip 35 and provide a sealing relationship therewith.

Insert tip 60 has a reduced diameter, axially extending flow passage 82 that communicates at its rear end with chamber 78 and extends entirely through insert tip 60. As illustrated, for example, in FIG. 14 flow passage 82 is substantially the same diameter at its rear end as the nozzle passage 32 at the convex discharge end of nozzle 20. At the front end 57 of insert body 58, insert 56 is provided with a forwardly facing surface 84 that is concentric with insert tip 60 and opposes front end wall 50 of well 48.

In one preferred embodiment of the invention, insert cup 56 is constructed from 420 stainless steel, while mold halves 38, 40 are constructed from P20 hardened steel and nozzle 20 is constructed from 4140 hardened steel. In such preferred embodiment, insert cup 56 thus has a lower thermal conductivity than nozzle 20 and mold 36.

Operation

During injection molding operations, nozzles 20 project forwardly into the chambers 78 of insert cups 56 with their convex nozzle tips 35 bearing against and intimately engaging concave seats 80. Each insert cup 56 can be slightly displaced axially toward cavity 42 as permitted by spring 72 to accommodate a slight over-length condition of nozzle 20 due to manufacturing inaccuracies. Conversely, if any particular nozzle 20 has a slightly under length condition, spring 72 biases that nozzle cup 56 rearwardly to the extent permitted by rib 54 so as to maintain sealing engagement between the convex nozzle tip 35 and concave insert seat 80. Intimate sealing relationship is also maintained between the lateral exterior of each insert tip 60 and the surrounding surface of gate opening 46. Similarly, intimate sealing relationship is maintained between the convex end of each nozzle base 22 and the concave seat 24 within manifold block 16.

As hot melt is supplied by manifold block 16 to each nozzle 20, the melt emanates from nozzle tip 35, flows through passage 82 in insert tip 60, and enters cavity 42. At the completion of the injection cycle, upper mold half 38 is lifted off lower mold half 40 with upper die set member 12, leaving behind insert cup 56 with nozzle 20 received therein. The new parison within cavity 42 on core 44 also remains behind. Core 44, with the parison thereon, is then raised and moved away from the lower mold half 40 to provide room for a new core 44. The new core is inserted into the lower mold half 40 and upper mold half 38 is lowered into operating position, whereupon the injection cycle is repeated.

As each upper mold half 38 comes down into superimposed relationship with lower mold half 40, upper mold half 38 closes about insert cup 56 without contacting nozzle 20. Thus, while insert cup 56 may become worn over time from repeated engagements with the upper mold half 38, the worn insert cup can be quickly and easily removed and replaced with a new cup. Moreover, gate opening 46 may require less frequent repair than in the past due to the fact that no nozzle tip is directly bearing against and wearing on the surfaces of the gate opening 46 as in prior constructions.

In this respect, it will be appreciated that the ball and socket relationship between the nozzle tips 35 and the swivel seats 80 of insert cups 56 affords the opportunity for the nozzles 20 to realign and skew to the extent necessary to accommodate dimensional misalignment in the tooling caused by thermal differentials and otherwise. Thus, rather than binding up within the gate openings 46 or damaging such areas when misalignment and thermal conditions would otherwise tend to cause such, nozzle tips 35 simply swivel against their seats 80 while maintaining intimate sealing engagement therewith. Such realignment is accomplished without in any way restricting the flow of hot melt through the nozzles and into the cavities of mold 36.

It will be appreciated that the swiveling relationship between nozzle tips 35 and insert cups 56 also provides significant time and labor savings during start up and shut down of the machine. In prior constructions, it was typically necessary to pull the nozzles completely back out of the molds prior to start up. With the bolts of the mounting blocks for the nozzles loosened, the manifold block and nozzles were heated up to their operating temperatures and then inserted into the molds, which were also at their operating temperatures. As the nozzles seated themselves within the molds, the loose mounting bolts accommodated slight realignment of the nozzles as necessary for the particular seats involved, whereupon the bolts were retightened to retain the nozzles in such positions. At shut down, the nozzles were withdrawn and allowed to cool separately from the molds in order to prevent bind up or damage within the molds.

With the present invention, however, there is no need for this time-consuming process. Instead, at shut down the nozzles 20 can simply remain fully inserted within their insert cups 56. As various parts of the tooling cool at non-uniform rates causing dimensional variations to arise, nozzles 20 simply swivel as need be at both their base ends 22 and their tip ends 35. At the other extreme, when the operation is started up, nozzles 20 can remain fully inserted within their insert cups 56 as all components of the tooling are brought up to their operating temperatures. Once again, the nozzles 20 can swivel at their opposite ends as need be within their respective seats to accommodate dimensional variations that arise.

Alternative Embodiment

FIGS. 15, 16, and 17 are directed to an alternative embodiment of the insert cup. In these figures, an insert cup 156 is constructed in two superimposed parts, i.e., a top half 156a and a bottom half 156b. Like insert cup 56, the insert cup 156 includes an elongated, generally cylindrical body portion 158 having a front end 157 and a rear end 159. A cylindrical, reduced diameter tip 160 projects forwardly from front end 157. A large diameter, nozzle-receiving chamber 178 is disposed within body portion 158 and extends forwardly from the open rear end 157 to a reduced dimension, concave seat 180 in the forward end wall of chamber 178. A reduced diameter flow passage 182 leads from an intersection with chamber 178 at seat 180 forwardly through tip 160 to the forwardmost extremity thereof.

Body 158 includes an annular flange 170 circumscribing the same at rear end 159, and a groove 162 surrounds body 158 behind tip 160 in the same manner as groove 62 in the first embodiment. A forwardly facing surface 184 is located at front end 157 at the base of tip 160.

The insert cup 156 is split along a parting line that bisects chamber 178 and flow passage 182. Such parting line is represented by the numeral 186 and is designed to match up perfectly with the split line between upper and lower mold halves 38, 40 when insert cup 156 is mounted on lower mold half 40. Insert cup 156 is mounted in the same manner as insert cup 56, using a retainer 64 and bolts 66. The spring 72 is utilized to engage the flange and yieldably bias insert cup 156 in a rearward direction in the same manner as the cup 56.

In addition to the first groove 162, the insert cup 156 is provided with a second annular groove 188 forwardly of groove 162 but behind front end 157 of body 158. A split ring 190 encircles insert cup 156 within groove 188 so as to yieldably maintain the opposing faces of halves 156a and 156b in contacting engagement with one another. However, the resiliency of split ring 190 permits slight adjusting movement of halves 156a, 156b relative to one another. Thus, when insert cup 156 is installed and top mold half 38 closes down against bottom mold half 40, any slight misalignment between insert cup half 156a and top mold half 38 can be self-corrected during interengagement between those two parts. This self-adjusting action helps prevent premature wear of insert cup 156 and upper mold half 38 and also contributes to decreasing the likelihood of leakage at the interfaces between insert cup 156 and mold halves 38, 40.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. Injection molding apparatus comprising:
   a hot melt distribution block having a concave swivel seat;
   a hot melt discharge nozzle secured to said block and having a convex swivel base engaged with said swivel seat in a manner to permit the base to swivel within its seat,
   said nozzle further having a convex discharge nozzle tip;
   a mold having a pair of opposed mold halves that cooperatively define, when the mold is closed, a cavity and a cylindrical gate opening leading to the cavity,
   at least one of said mold halves being movable away from the other mold half to open the mold along a split line that longitudinally bisects the gate opening and the cavity; and
   a tubular insert mounted on said other mold half and having a cylindrical insert tip projecting into the gate opening and disposed in sealing engagement with sidewalls of the gate opening,
   said insert being disposed to receive the nozzle for delivery of hot melt from the nozzle to the cavity and having a concave, internal swivel seat disposed for swiveling engagement with said convex nozzle tip when the nozzle is received within the insert.

2. Injection molding apparatus as claimed in claim 1,
said insert being mounted for limited axial displacement toward and away from said cavity as said insert tip slides within said gate opening,
further comprising a spring yieldably biasing the insert away from said cavity.

3. Injection molding apparatus as claimed in claim 2,
said other mold half having a stop disposed for limiting displacement of the insert away from said cavity.

4. Injection molding apparatus as claimed in claim 3,
said insert being mounted on said other mold half by an annular retainer secured to said other mold half and encircling the insert for permitting said axial displacement of the insert.

5. Injection molding apparatus as claimed in claim 4,
said spring being disposed between said retainer and structure on the insert.

6. Injection molding apparatus as claimed in claim 5,
said structure comprising a flange.

7. Injection molding apparatus as claimed in claim 1,
said insert being mounted on said other mold half by an annular retainer secured to said other mold half and encircling the insert.

8. Injection molding apparatus as claimed in claim 1,
said insert having a hollow, generally cylindrical body presenting opposite front and rear ends,
said insert tip projecting forwardly from said front end of the body and being of reduced diameter relative to the body.

9. Injection molding apparatus as claimed in claim 8,
the interior of said body presenting an enlarged receiving chamber for the nozzle and having a forwardmost endwall configured to present said concave swivel seat for the nozzle tip,
said insert tip having a reduced diameter flow passage extending axially therethrough and leading from said endwall in communication with said chamber.

10. Injection molding apparatus as claimed in claim 9,
said body having a generally radially extending front end face and a radially outermost, locating surface extending rearwardly from said front end face.

11. Injection molding apparatus as claimed in claim 10,
said body further having an annular groove disposed rearwardly from said locating surface,
said other mold half having a rib received within said groove.

12. Injection molding apparatus as claimed in claim 11,
said groove being enlarged in an axial direction relative to said rib to permit limited axial displacement of the insert toward and away from said cavity.

13. Injection molding apparatus as claimed in claim 12,
further comprising a spring yieldably biasing the insert away from said cavity.

14. Injection molding apparatus as claimed in claim 13,
said body having an annular flange at the rear end thereof,
said spring bearing against said flange.

15. Injection molding apparatus as claimed in claim 1,
said insert comprising a one-piece, unitary component.

16. Injection molding apparatus as claimed in claim 1,
said insert comprising a pair of insert halves having a parting line therebetween that is aligned with said split line of the mold halves when the mold is closed.

17. Injection molding apparatus as claimed in claim 16,
further comprising a resilient ring clamp around the insert yieldably holding the insert halves together.

18. Injection molding apparatus comprising:
a hot melt distribution block;
a hot melt discharge nozzle secured to said block and having a discharge nozzle tip;
a mold having a pair of opposed mold halves that cooperatively define, when the mold is closed, a cavity and a cylindrical gate opening leading to the cavity,
at least one of said mold halves being movable away from the other mold half to open the mold along a split line that longitudinally bisects the gate opening and the cavity; and
a tubular insert mounted on said other mold half and having a cylindrical insert tip projecting into the gate opening and disposed in sealing engagement with sidewalls thereof,
said insert being disposed to receive the nozzle for delivery of hot melt from the nozzle tip into the cavity through the insert tip,
said nozzle having a base end configured to permit the nozzle to swivel relative to the distribution block,
said nozzle tip being configured to permit the nozzle to swivel relative to said insert.

19. Injection molding apparatus comprising:
a hot melt distribution block;
a hot melt discharge nozzle secured to said block and having a discharge nozzle tip;
a mold having a pair of opposed mold halves that cooperatively define, when the mold is closed, a cavity and a cylindrical gate opening leading to the cavity,
at least one of said mold halves being movable away from the other mold half to open the mold along a split line that longitudinally bisects the gate opening and the cavity; and
a tubular insert mounted on said other mold half and having a cylindrical insert tip projecting into the gate opening and disposed in sealing engagement with sidewalls thereof,
said insert being disposed to receive the nozzle for delivery of hot melt from the nozzle tip into the cavity through the insert tip,
said distribution block having a concave swivel seat,
said nozzle having a convex swivel base engaged with said swivel seat in a manner to permit the base to swivel within its seat.

20. Injection molding apparatus as claimed in claim 19,
said nozzle tip being convex,
said insert having a concave, internal seat disposed for swiveling engagement with said convex nozzle tip when the nozzle is received within the insert.

* * * * *